(12) United States Patent
Ahopelto et al.

(10) Patent No.: US 7,764,968 B2
(45) Date of Patent: Jul. 27, 2010

(54) METHOD AND SYSTEM FOR MANAGING DELIVERY OF COMMUNICATIONS WHEN THERE IS A TEMPORARY SUSPENSION OF AT LEAST ONE TYPE OF COMMUNICATION

(75) Inventors: Timo Ahopelto, Helsinki (FI); Timo Romppanen, Helsinki (FI); Marko Ahtisaari, Helsinki (FI); Ismo Antikainen, Masala (FI)

(73) Assignee: Cvon Innovations Limited, London (GB)

( * ) Notice: Subject to any disclaimer, the term of this patent is extended or adjusted under 35 U.S.C. 154(b) by 129 days.

(21) Appl. No.: 12/082,175

(22) Filed: Apr. 9, 2008

(65) Prior Publication Data

US 2008/0311847 A1    Dec. 18, 2008

Related U.S. Application Data

(60) Provisional application No. 60/936,131, filed on Jun. 18, 2007.

(30) Foreign Application Priority Data

Nov. 8, 2007    (GB)    .................... 0721919.9

(51) Int. Cl.
    *H04W 72/00*    (2009.01)
(52) U.S. Cl. ..................................... 455/450
(58) Field of Classification Search .............. 455/414.1, 455/450
    See application file for complete search history.

(56) References Cited

U.S. PATENT DOCUMENTS

| | | | |
|---|---|---|---|
| 5,128,981 A * | 7/1992 | Tsukamoto et al. | ......... 455/450 |
| 5,678,179 A | 10/1997 | Turcotte et al. | |
| 6,097,942 A | 8/2000 | Laiho | |
| 6,556,817 B1 | 4/2003 | Souissi et al. | |
| 6,647,269 B2 | 11/2003 | Hendrey et al. | |
| 6,718,178 B1 | 4/2004 | Sladek et al. | |
| 6,889,054 B2 | 5/2005 | Himmel et al. | |
| 6,920,326 B2 | 7/2005 | Agarwal et al. | |
| 7,072,947 B1 | 4/2006 | Knox et al. | |
| 2001/0008404 A1 | 7/2001 | Naito et al. | |
| 2002/0032771 A1 | 3/2002 | Gledje | |
| 2002/0128908 A1 | 9/2002 | Levin et al. | |
| 2003/0003929 A1 | 1/2003 | Himmel et al. | |
| 2003/0110171 A1 | 6/2003 | Ozer et al. | |

(Continued)

FOREIGN PATENT DOCUMENTS

EP    1 073 293 A1    1/2001

(Continued)

OTHER PUBLICATIONS

U. K. Search Report under Section 17 dated Mar. 10, 2008 of corresponding U. K. Patent Application No. GB0721919.9.

(Continued)

*Primary Examiner*—William D Cumming
(74) *Attorney, Agent, or Firm*—Lucas & Mercanti, LLP.

(57) ABSTRACT

Method and system for managing delivery of communications such as advertisements to mobile telephone subscribers where delivery to subscribers is temporarily prevented or blocked at the request of the subscribers. In particular, a subscriber can temporarily suspend delivery of advertisements when they are roaming.

29 Claims, 4 Drawing Sheets

U.S. PATENT DOCUMENTS

| | | |
|---|---|---|
| 2004/0158612 A1 | 8/2004 | Concannon |
| 2004/0203761 A1 | 10/2004 | Baba et al. |
| 2005/0021853 A1 | 1/2005 | Parekh et al. |
| 2005/0027676 A1 | 2/2005 | Eichstaedt et al. |
| 2005/0055408 A1 | 3/2005 | Dong |
| 2005/0148350 A1 | 7/2005 | Kamphuis |
| 2005/0186940 A1 | 8/2005 | Schatzberger et al. |
| 2006/0025163 A1 | 2/2006 | Smith et al. |
| 2006/0041470 A1 | 2/2006 | Filho et al. |
| 2006/0094406 A1 | 5/2006 | Cortegiano |
| 2006/0109969 A1 | 5/2006 | Oh |
| 2006/0206586 A1 | 9/2006 | Ling et al. |
| 2006/0253327 A1 | 11/2006 | Morris et al. |
| 2007/0004380 A1 | 1/2007 | Ylikoski |
| 2007/0016488 A1 | 1/2007 | Ulenas |
| 2007/0033104 A1 | 2/2007 | Collins et al. |
| 2007/0047523 A1 | 3/2007 | Jiang |
| 2007/0088801 A1 | 4/2007 | Levkovitz et al. |
| 2007/0093202 A1 | 4/2007 | Hwang et al. |
| 2007/0117571 A1 | 5/2007 | Musial |
| 2007/0149208 A1 | 6/2007 | Syrbe et al. |
| 2007/0237330 A1 | 10/2007 | Srivastava |
| 2008/0032703 A1 | 2/2008 | Krumm et al. |
| 2008/0070579 A1 | 3/2008 | Kankar et al. |
| 2008/0215744 A1 | 9/2008 | Shenfield |

FOREIGN PATENT DOCUMENTS

| | | |
|---|---|---|
| EP | 1 161 093 A2 | 12/2001 |
| EP | 1 193 955 A2 | 4/2002 |
| EP | 1 239 395 A2 | 9/2002 |
| EP | 1 253 542 A2 | 10/2002 |
| EP | 1 298 945 A1 | 4/2003 |
| EP | 1 324 250 A1 | 7/2003 |
| EP | 1 365 604 A2 | 11/2003 |
| EP | 1 445 703 A1 | 8/2004 |
| EP | 1 613 102 A1 | 1/2006 |
| GB | 2 352 856 A | 2/2001 |
| GB | 2 356 777 A | 5/2001 |
| GB | 2 383 149 A | 6/2003 |
| GB | 2 407 002 A | 4/2005 |
| JP | 2002/140272 | 5/2002 |
| WO | WO 97/33421 | 9/1997 |
| WO | WO 98/37685 | 8/1998 |
| WO | WO 00/62564 | 10/2000 |
| WO | WO 01/22748 A1 | 3/2001 |
| WO | WO 01/55892 A1 | 8/2001 |
| WO | WO 01/69406 A1 | 9/2001 |
| WO | WO 01/77840 A1 | 10/2001 |
| WO | WO 01/78425 A1 | 10/2001 |
| WO | WO 01/97539 A2 | 12/2001 |
| WO | WO 02/23423 A1 | 3/2002 |
| WO | WO 02/31624 A2 | 4/2002 |
| WO | WO 02/44834 A2 | 6/2002 |
| WO | WO 02/059720 A2 | 8/2002 |
| WO | WO 02/080595 A2 | 10/2002 |
| WO | WO 02/084895 A1 | 10/2002 |
| WO | WO 03/015430 A1 | 2/2003 |
| WO | WO 03/038638 A1 | 5/2003 |
| WO | WO 2004/034671 A1 | 4/2004 |
| WO | WO 2004/054205 A1 | 6/2004 |
| WO | WO 2004/086791 A1 | 10/2004 |
| WO | WO 2004/114109 A1 | 12/2004 |
| WO | WO 2005/015806 A2 | 2/2005 |
| WO | WO 2005/062637 A1 | 7/2005 |
| WO | WO 2005/083980 A1 | 9/2005 |
| WO | WO 2005/086927 A2 | 9/2005 |
| WO | WO 2006/026505 A1 | 3/2006 |
| WO | WO 2006/110446 A1 | 10/2006 |
| WO | WO 2007/056698 A2 | 5/2007 |

OTHER PUBLICATIONS

International Search Report dated Nov. 25, 2008 issued by the International Searching Authority in counterpart International Application PCT/EP2008/057726.

Written Opinion dated Nov. 25, 2008 issued by the International Searching Authority in counterpart International Application PCT/EP2008/057726.

* cited by examiner

METHOD AND SYSTEM FOR MANAGING DELIVERY OF COMMUNICATIONS WHEN THERE IS A TEMPORARY SUSPENSION OF AT LEAST ONE TYPE OF COMMUNICATION

CROSS-REFERENCE TO RELATED APPLICATIONS

This application claims the benefit of U.S. Provisional Patent Application Ser. No. 60/936,131 filed Jun. 18, 2007 and UK Patent Application GB0721919.9 filed Nov. 8, 2007, the entire disclosure of each of which is incorporated by reference herein.

FIELD OF THE INVENTION

The present invention relates generally to methods and systems for managing delivery of communications to mobile devices, and more particularly to methods and systems for managing delivery of messages and advertisements to subscribers of a mobile telephone operator.

BACKGROUND INFORMATION

Usage of cellular or mobile telephones is very popular and common. In a typical arrangement for use of a mobile telephone, a user subscribes to a mobile telephone service offered by a mobile telephone operator or carrier and enters into, for example, a pre-paid or post-paid plan with the mobile telephone operator. A pre-paid subscription plan is usually an arrangement where the user pays in advance for the telephone services to be used over a future period of time. A post-paid subscription plan is usually an arrangement where the user pays for the telephone services after using the services.

The services available using the mobile telephone may be voice services (i.e., making and receiving telephone calls), messaging services such as Short Message Service (SMS), Multimedia Message Service (MMS), data services such as Internet browsing or Wireless Application Protocol (WAP) browsing, video calls, downloading content, streaming content, purchasing applications such as games or other software, using location, guidance or navigation services, finding information, and communicating with a group of people and others.

The popularity of mobile telephones has also enabled their use, along with related infrastructure, as a media for providing mobile marketing, i.e., advertisements to the users of the telephones.

An issue arises when advertisements of a mobile marketing campaign or other messages are sent to the mobile telephones of subscribers who are not using their home communications network operated by the mobile telephone operator, e.g., they are using a roaming network such as an international roaming network. Although a Home Location Register (HLR) managed by the mobile telephone operator indicates the subscriber's roaming status, it does not affect the communications to the subscriber and therefore does not prevent the forwarding of the advertisements to the roaming subscriber. Delivery of advertisements or messages to a roaming subscriber may be wasteful as the user may not be in a position to respond to the advertisements or messages and may be costly to the subscriber as roaming charges for delivery of such advertisements or messages may be significantly higher than if the subscriber were located in the home network.

SUMMARY OF THE INVENTION

The present invention is directed at least in part to a method and system for managing delivery of communications such as advertisements or messages from the operator of the user's home communications network to a mobile telephone subscriber where delivery of the communications or advertisements or messages to the subscriber, such as an internationally roaming subscriber who is not located in the home network, is temporarily prevented or blocked at the request of the subscriber.

In one embodiment, delivery of advertisements or messages to a roaming subscriber is blocked by enabling the subscriber (user)to opt out of receiving advertisements or messages for a certain period, i.e., temporarily suspend the delivery of advertisements or messages. This may be achieved by enabling the user to access an Internet site operated by the entity managing advertisements for the mobile telephone operator, contact a service center operated by the mobile telephone service operator, or use a feature of their mobile telephone device, and indicate their desire to suspend delivery of advertisements or certain messages. Suspension of delivery of advertisements or messages may be achieved by, clicking on, for example, a "holiday" button generated at the Internet site, or on or through the user's mobile telephone device.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
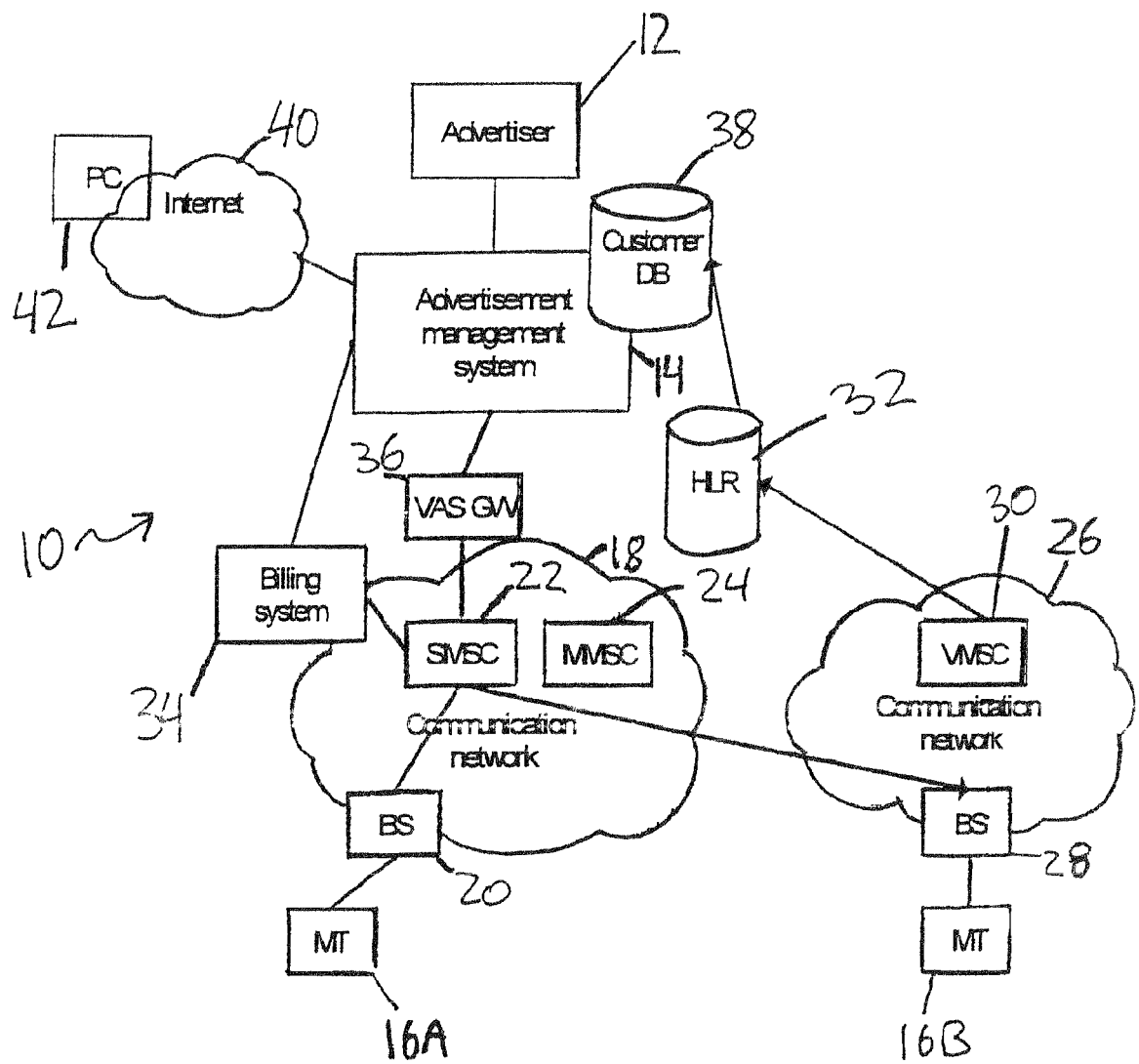
FIG. 1 is a schematic of an exemplifying architecture of an advertisement system in accordance with the invention.

Referring to the accompanying drawings wherein the same reference numerals refer to the same or similar elements, FIG. 1 shows an architecture of an embodiment of a mobile telephone advertising management system in accordance with the invention which is designated generally as 10. System 10 may be implemented to provide subsidized or even free mobile telephones services, the subsidy being provided by advertisers whose advertisements are being directed to subscribers of the mobile telephone service.

The system 10 includes one or more advertisers 12, defined to include any and all entities or individuals that want to advertise products or services to customers participating in the mobile marketing arrangement, and an advertisement management system 14 that is operated by, for example, an advertising delivery company.

Advertisers 12 can thus refer to a brand owner, a service provider, an advertisement agent, a merchant or any other party that wants to provide advertisements to consumers. Advertisements can be commercial, such as a product or service promotion, or non-commercial, such as a general information service notification.

Typically, the operator of the advertisement management system 14 is a company in the business of delivering advertisements from several advertisers, i.e., it is the intermediary between advertisers and the operators of the advertisement distribution channels. Operation of the advertisement management system 14 is typically managed over an Internet interface, but other systems of operation are foreseen.

The advertisement management system 14 preferably includes tools for each advertiser to define rules of their advertisement campaign, i.e., to enable them to tailor the advertisement campaign to their specific desires. This may include reserving, programming and/or booking an advertising campaign via an Internet interface. Parameters which are determined include, but are not limited to, the time period or periods when to send advertisements, the duration of the advertising campaign, the target group or groups, demographics of the target group(s), the format or type of advertisement, the target price level or cost per advertisement or for the advertising campaign in its entirety, the sociological background of the target audience, demographics of the target group(s) including, for example, age, sex and income level(s), target telephone type, etc. In addition to determining the rules, each advertiser 12 typically provides one or more actual advertisements in the form of data, text, pictures, video, audio, html-documents, links, television content, videos, HTML, xHTML, WAP pages, web pages, etc., or any digital content compatible for reception and display by the users' mobile terminals 16A, 16B.

An advertisement can be delivered to the users' mobile terminals 16A, 16B via a communications network 18. The communications network 18 may be any cellular, broadcast, wide area, local area or Internet network. For example, FIG. 1 shows a typical layout of a cellular communications network 18 including one or more base stations (BS) 20, a Short Message Service Center (SMSC) 22 and a Multimedia Message Service Center (MMSC) 24. Communications network 18 can also be a combination of different communications networks such as a Wireless Local Area Network (WLAN) and a Wideband Code Division Multiplex (WCDMA) network.

Communications network 18 can utilize any cellular network technologies which include, but are not limited to, GSM, WCDMA, CDMA, GPRS. In addition to traditional cellular networks, local area networks such as Wireless Local area networks (WLAN), BlueTooth (BT) and other technologies such as WiMax, Broadcasting over DVB-H, ISDB-T, DMB or broadcasting over cellular can be used to deliver advertisements. The communications network 18 can also be a generic Internet access network using any data transport methods. Using the foregoing networks, the advertisements from advertisers 12 can be SMS, MMS, WAP Push, Web pages, or any digital object.

Subscribers to the mobile telephone operator using the mobile terminals 16A, 16B can use the same communications network or another communications network as the communications network 18 being used to deliver advertisements from advertisers 12 via the advertisement management system 14, i.e., a hybrid network is possible. In a preferred embodiment, the communications network 18 is a cellular network and the users' mobile terminals 16A, 16B are mobile devices such as a mobile telephone, a multimedia computer, a multimedia communication device, a PDA or a laptop computer.

The communications network 18 can be considered as the home communications network of the users of the mobile terminals 16A, 16B. At times, for example, when a user's mobile terminal 16B is unable to access the home communications network 18, the user's mobile terminal 16B must access a roaming communications network 26. Roaming network 26 is any non-home communications network where the user's mobile terminal cannot access the home communications network 18, for example, when the user is visiting a place not covered by home communications network 18. A common example of this situation is a mobile telephone service subscriber who visits a foreign country and accesses mobile telephone services in the foreign country using a local network in that country.

When the user's mobile terminal 16B accesses roaming network 26, transmissions for mobile terminal 16B are sent via a base station 28 of this roaming network 26 from the SMSC 22 of the home communications network 18, when the transmission is a SMS. In the roaming network 26, there may often be a Visited Mobile Switch Center (VMSC) 30 which provides location updates of the visiting mobile user to a Home Location Register (HLR) 32 of the home communications network 18.

When the user of mobile terminal 16B uses roaming network 26, there is typically a different, higher cost incurred to send and receive communications, in contrast to use of the home communications network 18 by the same user. The higher cost is for the sending and receiving of most if not all communications including messages such as marketing messages sent from the advertisement management system 14 to the mobile terminal 16B and messages from the operator of the user's home communications network such as, for example, user surveys and opinion polls. Other than marketing messages from advertisement management system 14, communications to and from the user of mobile terminal 16B which incur a higher cost may be those to or from any other user and/or computer system, regardless of the form of the communication, i.e., voice, messaging, data and the like.

As shown in FIG. 1, arrangement 10 also includes a billing system 34 coupled to the advertisement management system 14 and/or the communications network 18 or specific parts thereof, i.e., the SMSC 22 as shown in FIG. 1, and may be arranged to monitor and/or meter usage of the communications network 18 by each mobile terminal 16A, 16B and monitor and/or meter usage and payments of or for the advertisements being delivered to each mobile terminal 16a, 16B by the advertisement management system 14. The billing system 34 may be a real-time billing system or a close-to-real-time billing system. The billing system 34 or other suitable means associated with the arrangement 10 can thus arrange for payment from users of the mobile terminals 16A, 16B based on their usage of the communications network 18. Usage of the communications network 18 may entail voice services, messaging services (Short Message Service, Multimedia Message Service, Instant Message Service, Electronic mail services), video telephony services, push-to-talk services, data services such as Internet or Wireless Application Protocol (WAP) browsing services, content usage (television, radio, video) services, download services, among others.

In one embodiment of the invention, billing system 34 meters usage of the services by each user and compares the metered usage with a free or subsidized balance allocated to each user. In this manner, although invoices are not sent to the users, the metered usage is compared with business rules associated with the users and the cost for providing the free or subsidized services to the users is invoiced directly or indirectly from advertisers. Other techniques to provide subsidized or free telephone services to the users are also envisioned. For subsidized telephone services, the users may be responsible for a portion of their usage (either in network usage or only for roaming) and thus they would be interested in eliminating unnecessary use of such telephone services.

Arrangement 10 includes a Value Added Service Gateway (VAS GW) 36 that connects communications network 18, or some of the elements thereof such as the SMSC 22 as shown, to the advertisement management system 14. The VAS GW 36 can also be connected to the billing system 34.

Advertisement management system 14 includes a database 38 containing information such as profiles of the users of the mobile terminals 16A, 16B and a set of parameters or rules, and preferences of the users relating, for example, to delivery of advertisements and other messages to the users. An interface to the database 38 can be provided to enable users to modify one or more of their associated delivery parameters, for example, a web interface which enables management of the database 38 via the Internet 40. Typically, this can be done with a personal computer 42 or a mobile telephone which has a Web or Wireless Application Protocol (WAP) browser and an Internet (or WAP) connection. Another interface may be generated by a computer program at the users' mobile terminals 16A, 16B, and the user-defined parameters would then be transmitted to the database 38 via the communications network 18.

In accordance with one embodiment of the invention, one of the parameters and preferences contained in the database 38, and which is adjustable by the user, is the reception of communications in general while roaming, i.e., the user can indicate whether they want to receive communications while roaming or not. An indication that a user does not want to receive communications while roaming is considered an indication to prevent or block communications to the user. More specific preferences enable the user to receive or refuse reception of advertisements or messages which may also be or contain advertisements, or messages from the operator of the user's home communications network such as user surveys and opinion polls, in particular when roaming. All of these parameters or preferences can be set by the user using the personal computer 42 connected via the Internet 40 to the database 38 associated with the advertisement management system 14. The user is enabled to adjust the delivery parameters and preferences by means of a computer program in the advertisement management system 14 which manages the database 38 and provides the user interface. Additional details about the computer program are set forth below.

One way to enable the user to control the reception of communications when roaming is to provide a "Pause" preference selectable by the user, for example, present a "pause" button or "holiday" button" to the user's display associated with the personal computer 42. A similar "holiday" button could also be presented at the users' mobile terminals 16A, 16B.

When the user clicks on this "holiday" button, reception of advertisements and other marketing communications while roaming is prevented. The same or a different button may be programmed to enable the user to prevent reception of some or all other types of communications, or from some or all other communication sources. Clicking on the "holiday" button could be effective to suspend delivery of advertisements for a preset period of time, after which advertisements would then be delivered, or indefinitely and require the user to click a "resume" button or similar button to restart delivery of advertisements.

In one embodiment, the computer program is arranged to present the user with one or more selectable fields to indicate the start date (and optionally time) to suspend the delivery of advertisements, messages from the operator of the user's home communications network (such as user surveys and opinion polls) and other marketing communications, and one or more other selectable fields to indicate the stop date (and optionally time) of the suspension of the delivery of advertisements and other marketing communications, i.e., when delivery should resume. A user may select the delivery suspension start and stop dates based on their expected time period during which they, and thus their mobile terminal, would not be using their home communications network 18 for communications but rather would be using a roaming communications network 26. However, this "holiday" function can be used whenever a user wants to suspend reception of advertisements and messages from the operator of the user's home communications network, regardless of whether they are actually on vacation or expected to be outside of the range of the home communications network 18. There are limits to the suspension of delivery of advertisements and messages from the operator of the user's home communications network, discussed below.

By means of the interface, the user could be presented with a list of different communication sources and communication types and can select which communication type(s) they do not want to receive and from which communication sources they do not want to receive any communications. Thus, the user could select not to receive all advertising communications regardless of their source, or all messages from the operator of the user's home communications network, and all communications from advertisement management system 14 regardless of their type. For each source and type, the user could be presented with a separate display to enable selection of the start and stop dates (and optionally times) for suspension of delivery of communications from that source or of that type. The advertisement management system 14 would store all of the user-defined preferences in the database 38.

The lists and start and stop dates (and optionally times) can be freely managed by the users. However, conditions may be, and preferably are, imposed to prevent a user from receiving free telephone service without receiving, being available to receive or responding to advertisements, messages from the operator of the user's home communications network, and other marketing communications for a certain amount of time per predetermined period of usage time. Similarly, the subsidy provided to a user may depend on the time during which advertisements, messages from the operator of the user's home communications network, and other marketing communications are or can be delivered to the user or are responded to by the user, and thus to maintain the subsidy, a user might be required to receive, be available to receive or respond to advertisements, messages from the operator of the user's home communications network, and other marketing communications for a certain amount of time, or a certain number of advertisements or messages, over a predetermined period of usage time. A response by a user to an advertisement or message from the operator of the user's home communications network would confirm viewing of the advertisement or message by the user. The predetermined period of usage time may be dependent on a service agreement or contract between the user and the service provider, e.g., thirty days, monthly, forty-five days, and it is also foreseen that the time during which the user must be available to receive advertisements can also preferably set forth in the contract, e.g., twenty days per thirty day period or per month, or thirty days per forty-five day period.

When the conditions may require that the user be available to receive advertisements, messages from the operator of the user's home communications network, and other marketing communications for a set number of days per predetermined period of usage time of the mobile telephone service, there is therefore a limit on the number of days a user can suspend delivery of advertisements, messages from the operator of the user's home communications network, and other marketing communications. The user can be notified of the number of days that they have suspended delivery of advertisements and messages, and the number of days remaining during which they can suspend delivery of advertisements and messages, for the predetermined period of time, when they access the advertisement management system 14 to enter delivery suspension start and stop dates. A user can either be prevented from suspending delivery of advertisements or messages for more than a certain amount of time or can be notified that they will lose their free or subsidized telephone service if they indicate a suspension period longer than permitted.

In one embodiment, when a user suspends delivery of advertisements or messages and other marketing communications, while roaming or for other reasons, the duration of the suspension is not considered in the predetermined period of time during which they must receive, be available to receive or respond to advertisements or messages. Thus, if the user suspends delivery of advertisements or messages for ten days of a thirty day service period, the service period would be extended for ten days and in this extended forty day period, they would have to receive, be available to receive or respond to the same number of advertisements or messages as for a full, consecutive thirty day service period.

If the user suspends delivery of any or all communications while roaming for example, in one embodiment, the advertisement management system 14 stores messages being sent to the user during the suspension period and once the user is subsequently determined to be using the home communications network, these messages are then delivered to the user.

Instead of accessing the advertisement management system 14 to input delivery suspension start and stop dates, a user can alternatively, contact a service center and provide the start and stop dates, or their mobile terminal may be provided with an option to enable selection of start and stop dates which would then be communicated to the advertisement management system 14.

In one embodiment, the user is charged to receive communications when roaming. In this case, it is to the user's benefit to use the "holiday" feature to prevent reception of communications while roaming.

Database 38 stores the user's selected parameters and preferences and can be changed as the user accesses it. Database 38 is thus a dynamic database which may at one time, prevent communications of advertisements or other types of communications to different sets of subscribers to the mobile telephone service at different times.

The HLR 32 monitors the communications network which the user's mobile telephone is using, i.e., provides an indication of which communications network the user's mobile telephone is using such as communications network 18 or communications network 26 in the embodiment shown in FIG. 1. There are other systems which perform the same function as the HLR and these other network-determining or monitoring systems are also envisioned to be within the scope and spirit of the invention.

In use, the HLR 32 or other monitoring system would be programmed to trigger roaming status to the advertisement management system 14, i.e., notify the advertising management system 14 that the user's mobile terminal 16B is not communicating using communications network 18 and thus roaming using another operator's communications network.

The triggering of the advertisement management system 14 or status notification provided by the HLR 32 may be an indication whether the user is roaming or not, an identification of the location or country in which the user is roaming (which may be made based on the communications network the user is using) and/or an identification of the operator whose communications network the roaming user is using to communicate.

In one embodiment, when the HLR 32 triggers the advertisement management system 14 that the user is roaming, this may be used by a computer program in the advertisement management system 14 to pause or temporarily suspend the delivery of advertisements to the user's mobile terminal, on condition that the "Pause" preference, or "holiday" button, has been selected by the user. If the "Pause" preference has not been selected by the user, then even though the user is roaming, they could still receive advertisements.

Specifically, the advertisement management system 14 may direct a message to the VAS GW 36 causing it to stop sending advertisements or messages from the operator of the user's home communications network to the user's mobile terminal 16B when the user has selected the "Pause" preference and is roaming. Another condition for the delivery of the advertisement or messages is that there is at least one advertiser that has allowed for delivery of advertisements to users not using the home communications network, i.e., roaming users. If there are no such advertisers, the communications to the roaming user will either not be subsidized or not permitted.

If the user has not selected the "Pause" preference, then the computer program in the advertisement management system 14 may be arranged to send a message to the billing system 34 when a user is determined to be roaming (using a communications network other than their home communications network 18) to inform the billing system 34 about the roaming for the purpose of, for example, determining the cost of delivering an advertisement or message to the roaming user.

The billing system 34 may be arranged to bill advertisers for delivery of advertisements or messages to users at different rates depending on the roaming status of the users. For example, a computer program in the billing system 34 may determine a subsidized rate for delivery of an advertisement or message to a user using their home communications network while there would be a non-subsidized rate or higher rate when the user is roaming using another operator's communications network. The billing system 34 would therefore need to know whether the user is roaming in order to determine the appropriate billing for deliver of an advertisement or message to a user.

As discussed above, the advertisement management system 14 includes a computer program which enables users to define parameters and preferences for delivery of any communications addressed to them, in particular when roaming. For example, the user could use the interface to the computer program at the advertisement management system 14 to indicate permitted senders of messages, i.e., indicate a desire to receive messages from a list of certain persons, and also indicate non-permitted senders, i.e., indicate a desire to block reception of messages from others (whether specified or unspecified). This procedure could alternatively or additionally include setting up a permission indicator to receive other types of communications such as telephone calls from a list of certain persons or entities while similar communications from others are blocked. Alternatively or additionally, this procedure could entail setting up a list of data or other types of services which can be accessed when roaming.

The advertisement management system 14 can have default values for blocking messaging and other data transfer techniques to and/or from the roaming network so that a user would have to change from the defaults in order to receive messages and/or other types of communications when roaming. On the other hand, the advertisement management system 14 can have default values for allowing messaging and other data transfer techniques to and/or from the roaming network so that a user would have to change from the defaults in order to block messages and/or other types of communications when roaming. In both embodiments, a user could create a list of permitted senders whose communications they will accept while roaming.

Figure 2:
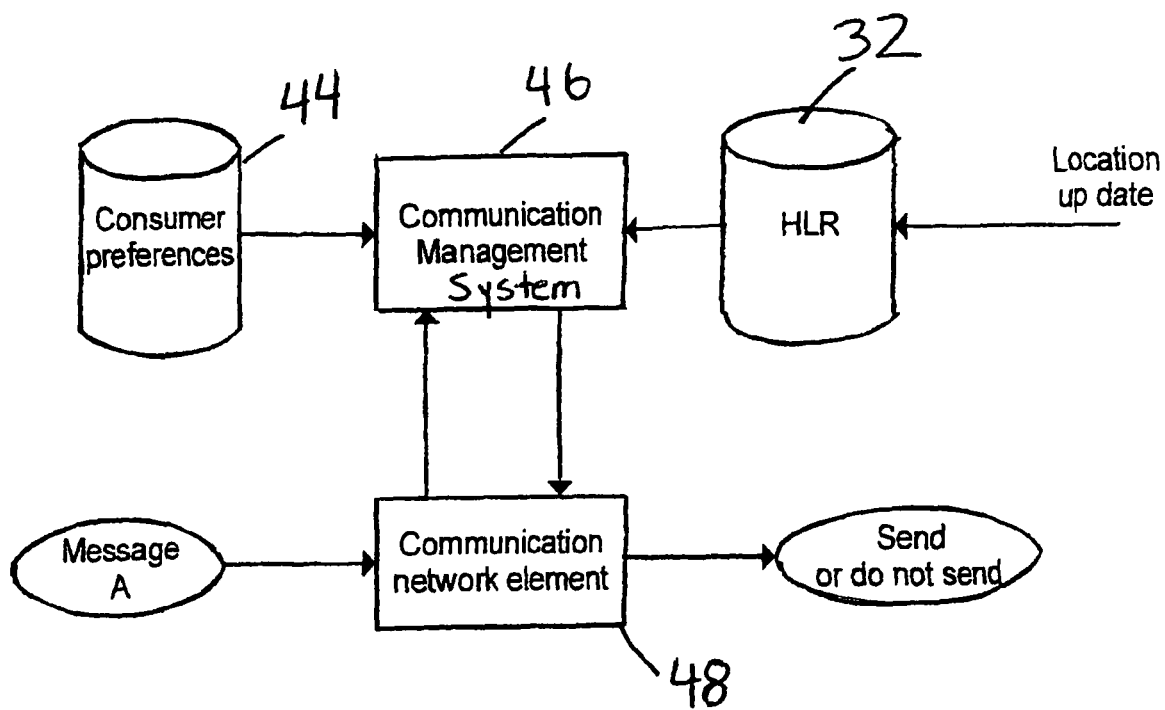
FIG. 2 is a schematic of a communications arrangement for use in an advertisement system and method in accordance with the invention.

FIG. 2 shows a diagram of exemplary communication management software which may be resident in the advertisement management system 14, or in a separate server connected thereto. Using the software, each user inputs their preferences vis-à-vis reception of communications 44. A communications management system 46 receives the user's preferences from 44 and information about the communications network the user is using from the HLR 32. Based on the user's preferences and the communications network the user is using, the communications management system 46 determines whether or not a message A is to be delivered to the user.

A communication network unit 48 receives message A which informs the communication management system 46 of the message origin and target and/or sends message A and its origin and target to the communication management system 46. The communication management system 46 generates a control message to the communication network unit 48 to allow delivery of the message A to the user or to block such delivery. Blocked messages may be stored in the communication network unit 48 or/and in the communications management system 46, for example, until such time as the user is no longer roaming and is using the home communications network.

Message A, whose delivery is controlled by communications management system 46, can be any type of communicable message capable of being delivered to a mobile device, including but not limited to the following: an SMS message, an MMS message, an WAP push message, a data call, a voice call, a video call, music streaming, video streaming, an advertisement message, a marketing message, a message from a group of people, a message to group of people, a message from an individual person, a message to an individual person, a message from a computer system or systems, and a message to a computer system or systems. Message A can be also a message to a roaming network or from a roaming network.

Figure 3:
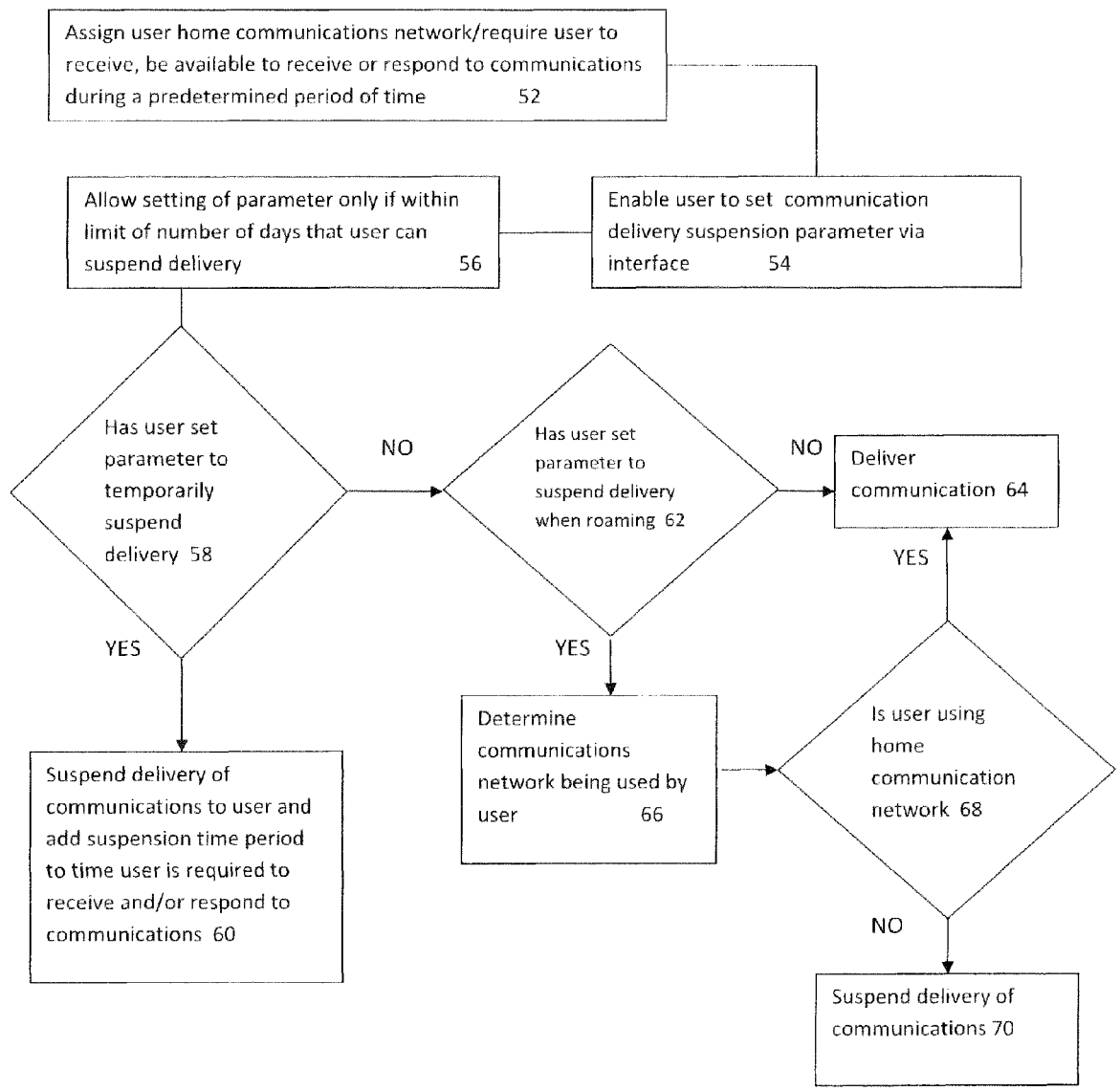
FIG. 3 is a flow chart showing a method for managing delivery of communications in accordance with the invention.

Referring now to FIG. 3, in a method for managing delivery of communications to a user of a mobile communications device, the user is assigned a home communications network and the user is required user to receive, be available to receive or respond to communications during a predetermined period of time, at 52. Thereafter, the user can set a parameter relating to delivery of communications to their mobile communications device, at 54. The user can interface with a computer program managing the delivery of communications to the user in order to set the parameter. The parameter is a parameter relating to at least one type of communication. The time during which a user can temporarily suspend delivery of communications may be regulated to limit the number of days that the user can suspend delivery of communications, at 56.

A determination is made at 58 whether the user has set the parameter to temporarily suspend delivery of communications and if so, delivery of communications to the user is suspended and the predetermined period of time for which the user is required to receive, be available to receive or respond to communications is extended by the duration of time for which the user has temporarily suspended delivery of communications, at 60.

If not, a determination is made at 62 whether the user set the parameter to suspend delivery when roaming since the regulated changes to the parameter may relate to temporary suspension of delivery of communications when the user is using a roaming communications network which is not the user's home communications network. If the user has not set the parameter, then communications are delivered at 64. If the user has set the parameter, then the communications network being used by the user is determined at 66 and a determination is made at 68 as to whether the communications network is the user's home communications network. Delivery of communications to the user is prevented at 70 when the user is operatively determined not to be using their home communications network, i.e., using a roaming communications network.

Figure 4:
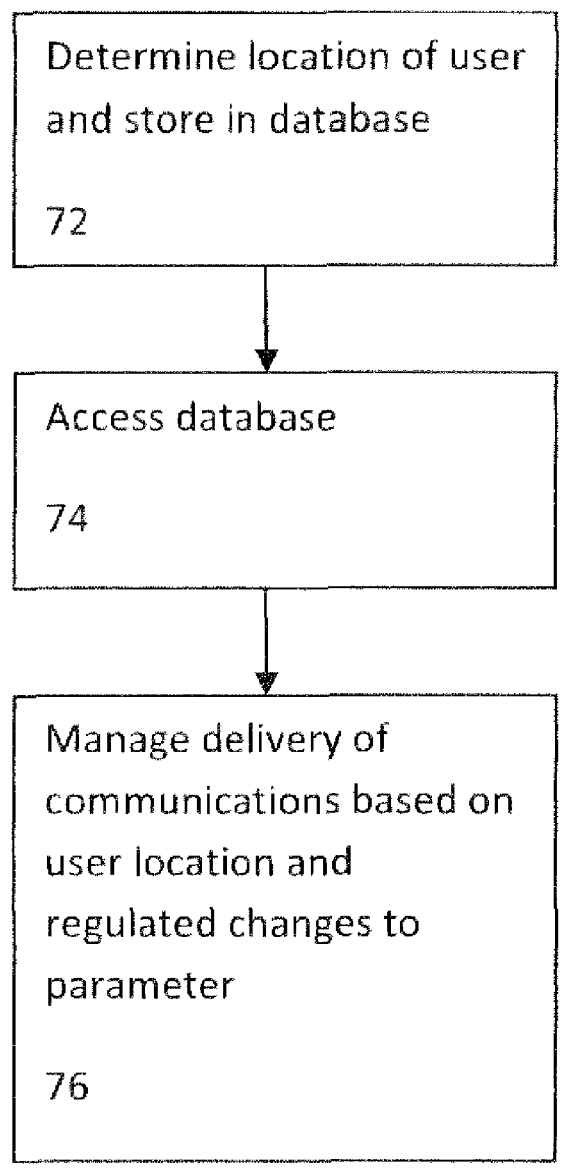
FIG. 4 is a flow chart showing a variation of the method for managing delivery of communications in accordance with the invention shown in FIG. 3.

Referring now to FIG. 4, the parameter may further relate to temporary suspension of delivery of communications based on the user's location, in which case, the method entails determining a location of the user based on a communications network the user is using, and maintaining location information about the user in a database, at 72. Then, the database is accessed at 74 to determine the location of the user and delivery of communications to the user is managed based on the location of the user and regulated changes to the parameter, at 76.

Several computer programs resident on computer-readable media may be used in the invention. One computer program is resident in the advertisement management system 14 and manages delivery of communications to users' mobile devices, in particular advertisements. The computer program enables users to manage parameters and preferences for delivery of communications to their mobile devices, maintains the parameters and preferences managed by the users in a database, and upon receiving a request to deliver communications to the users, checks the database to ascertain whether the users have permitted or blocked the delivery of such communications. If such communications have been blocked, they will not be delivered.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

The parameters and preferences relating to the delivery of communications may include indications to allow or block specific types of communications and communications from specific sources, as well as indications to allow or block specific types of communications and communications from specific sources when the user is not using their home communications network, i.e., the user is using a roaming network, or even when the user is located in the home communication network but does not want to receive certain types of communications. Different preferences may be created depending on whether the user is roaming or not. As such, each user can allow or block delivery of specific types of communications such as advertisements when roaming, or allow or block communications from specific sources when roaming.

In one embodiment, the computer program enables the users to manage their parameters and preferences using an Internet interface. For example, the computer program may be arranged to present each user with a display on a screen of their computer including a list of senders of communications and allow the user to indicate whether they want to accept or block communications from these senders. Also, a list of different types of communications can be displayed and the user is provided with means to allow them to indicate whether they want to accept or block these types of communications. Each user can manage their lists as they desire, e.g., add senders to the lists.

In addition to or instead of the enabling users to set parameters and preferences for delivery of communications to their mobile devices when roaming or otherwise, the computer program may automatically manage delivery of communications to the users based on which communications network they are using. This may be determined by a network-usage determining system, such as a home location register, with the database containing data about the users and an indication of the communications network the users are using. The computer program may manage the network-usage determining system and thus determine which communications network each user is using.

The database may be maintained by the computer program itself or maintained by another computer program and accessed by the computer program. Thus, whenever a request to deliver a communication to a user is received, a determination is made whether to deliver communications to the user by checking the database to ascertain which communications network the user is using and allowing or preventing delivery of communications to the user based on which communications network they are using. Analysis of the type of communication may also be made to prevent delivery of some types of communications, such as advertisements, while allowing delivery of other types of communications, such as service messages.

In this regard, the computer program could associate a communications network as each user's home communications network and other networks as roaming networks and prevent delivery of communications to users using a roaming network. The database could therefore contain an indication of each user's home communications network. This feature would be useful in a situation where the users receive mobile telephone services at a subsidized cost or free in exchange for receiving advertisements, and the cost to deliver the advertisements to users using a roaming network is greater than the revenue gained by the mobile telephone service operator for delivery the advertisement to the user. Additional details about this feature are set forth in the application by the same inventors as the present application entitled Method and System For Managing Delivery of Communications, filed on the same day as the present application, the entire disclosure of which is incorporated herein by reference.

The foregoing enables innovative and focused mobile marketing and advertising. This is important because such a concept is considered by advertisers as the next new channel to directly reach consumers since it utilizes core assets and characteristics of the mobile media, namely, it is personal in that it is directed solely to individual consumers, it is "always on" and can reach the consumers whenever they access their communications devices, it is mobile and naturally forms groups of people who communicate actively with each other. These characteristics combined with social networks-based approaches of the Internet could form a very powerful base to execute marketing strategies.

In general, mobile marketing and advertising can be divided into the following four categories: mobile marketing, mobile advertising, mobile direct marketing and mobile customer relation management (CRM). The present invention in any of its forms discussed above is applicable to all categories.

Mobile marketing is commonly considered as the systematic planning, implementing and control of a mix of business activities intended to bring together buyers and sellers for the mutually advantageous exchange or transfer of products or services where the primary point of contact with the consumer is via their mobile device.

Mobile advertising is commonly considered as the paid, public, non-personal announcement of a persuasive message by an identified sponsor as well as the non-personal presentation or promotion by a firm of its products to its existing and potential customers where such communication is delivered to a mobile telephone or other mobile device. Examples of mobile advertising include: Wireless Application Protocol (WAP) Banner ads, mobile search advertising, mobile video bumpers, and interstitial ads in or on device portals.

Mobile direct marketing is commonly considered a sales and promotion technique in which promotional materials are delivered individually to potential customers via the potential customer's mobile telephone or other mobile device. Examples of mobile direct marketing include the sending of Short Message Service (SMS), Multimedia Message Service (MMS) or Wireless Application Protocol (WAP) push messages, Bluetooth messaging and other marketing to mobile telephones or other mobile devices.

Mobile customer relation management is commonly considered as a combination of all the foregoing in a manner that establishes a long-term, engaging relationship between the customer and the marketing or promoting company. At present, mobile marketing and advertising is mostly based on push campaigns to opt-in a consumer mobile number in a database, or pull campaigns that acquire mobile telephone numbers from consumers. The most typical example of the pull campaign is the "text-to-win" campaign where, e.g., a soft drink bottle contains a short code to be sent via text message to a certain telephone number. In return, the consumer receives a notification if they have won with the selected marketing message, or a series of messages is broadcast to their mobile telephone. Other popular methods of direct advertisement are achieved using text and video messaging.

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims.

The invention claimed is:

1. A method for managing delivery of communications to a user of a mobile communications device, the user being assigned a home communications network, the method comprising:
   arranging for the user to set a parameter relating to delivery of communications to their mobile communications device, in which said parameter is a parameter relating to temporary suspension of at least one type of communication;
   regulating changes to said parameter in accordance with temporal criteria so as to control the time during which delivery of communications is temporarily suspended, the regulated changes to said parameter relating to temporary suspension of delivery of communications when the user is using a roaming communications network which is not the user's home communications network;
   delivering communications to the user in accordance with said regulated changes to the parameter;
   requiring the user to receive, be available to receive or respond to communications during a predetermined period of time;
   extending this predetermined period of time by the duration of time for which the user has temporarily suspended delivery of communications; and
   determining whether a communications network being operatively used by the user is the user's home communications network or a roaming communications network; and
   preventing delivery of communications to the user when the regulated changes to said parameter suspend delivery of communications when the user is using a roaming communications network and the user is operatively determined to be using a roaming communications network.

2. The method of claim 1, further comprising regulating the time during which a user can temporarily suspend delivery of communications to limit the number of days that the user can suspend delivery of communications.

3. The method of claim 1, further comprising preventing delivery of communications to the user when the regulated changes to the parameter temporarily suspend delivery of communications even when the user is using their home communications network.

4. The method of claim 1, wherein the parameter further relates to temporary suspension of delivery of communications based on the user's location, the method further comprising:
   determining a location of the user based on a communications network the user is using; and
   maintaining location information about the user in a database, the step of delivering communications to the user comprising accessing the database to determine the location of the user and managing the delivery of communications based on the location of the user and regulated changes to the parameter.

5. The method of claim 1, further comprising enabling the user to interface with a computer program managing the delivery of communications to the user in order to set the parameter.

6. A system for managing delivery of communications to a user of a mobile communications device, comprising:
   a communications management system arranged to receive content from content providers for delivery to the user;
   a database containing a user-determined parameter relating to delivery of communications to their mobile communications device, said parameter being a parameter relating to temporary suspension of delivery of communications, wherein the time during which a user can temporarily suspend delivery of communications is regulated to limit the number of days within a predetermined period of time that the user can temporarily suspend delivery of communications;
   a communications network coupled to said communications management system and said database for delivering communications containing said content from said communications management system to the user in accordance with the user-determined parameter in said database, wherein the database is in operative association with a processing component arranged to control changes to the parameter in accordance with temporal criteria so as to control the time during which delivery of communications is suspended, said processing component being further arranged to extend a predetermined period of time, during which the user is required to receive, be available to receive or respond to communications, by the duration of time for which the user has temporarily suspended delivery of communications; and
   a determining system for determining the communications network being used by the user, said database containing data about the communications network being used by the user as determined by said determining system and providing the data to said communications management system, said communications management system being arranged to manage delivery of communications to the user via said communications network based on the communications network being used by the user and the regulated changes to the parameter in said database.

7. The system of claim 6, wherein said determining system is a home location register.

8. The system of claim 6, wherein said parameter relates to suspension of delivery of communications when the user is using a roaming communications network which is not the user's home communications network.

9. The system of claim 8, wherein said communications management system is arranged to manage delivery of communications to the user based on whether the user is using the user's home communications network or a roaming communications network and whether the user set the parameter to suspend delivery of communications when using a roaming communications network.

10. The system of claim 6, further comprising an interface for enabling the user to interface with said database and manage the parameter.

11. The system of claim 6, wherein said database is arranged to store start and stop dates determined by the user for the temporary suspension of delivery of communications.

12. The system of claim 6, wherein the database further comprises an additional user-determined delivery parameter indicative of whether the user wants to temporarily suspend delivery of all communications to their mobile device, said database being arranged to store start and stop dates determined by the user for suspension of delivery of all communications.

13. The system of claim 6, wherein the database further comprises an additional user-determined delivery parameter indicative of a selectable list of different communication sources from which the user could receive communications and a selectable list of different communication types which the user could receive.

14. The system of claim 6, wherein said communications management system includes a secondary communications management system arranged to manage communications to the user, said secondary communications management system being arranged to receive content intended for delivery to the user, data from said database about said user-determined delivery parameter and data about the communications network being used by the user to determine whether the content should be delivered to the user on the basis thereof, and if so, to control a communications network element to deliver the content to the user.

15. The system of claim 14, wherein said secondary communications management system is arranged to receive an indication of the sender and recipient of communications and optionally the communications via the communications network element.

16. A system for managing delivery of communications to a user of a mobile communications device, comprising:
 a communications management system arranged to receive content from content providers for delivery to the user;
 a database containing a user-determined parameter relating to delivery of communications to their mobile communications device, said parameter being a parameter relating to temporary suspension of delivery of communications, said parameter further relating to suspension of delivery of communications when the user is using a roaming communications network which is not the user's home communications network; and
 a communications network coupled to said communications management system and said database for delivering communications containing said content from said communications management system to the user in accordance with the user-determined parameter in said database, wherein the database is in operative association with a processing component arranged to control changes to the parameter in accordance with temporal criteria so as to control the time during which delivery of communications is suspended, said processing component being further arranged to extend a predetermined period of time, during which the user is required to receive, be available to receive or respond to communications, by the duration of time for which the user has temporarily suspended delivery of communications,
 said communications management system being arranged to manage delivery of communications to the user based on whether the user is using their home communications network or a roaming communications network and whether the user set the parameter to suspend delivery of communications when using a roaming communications network.

17. The system of claim 16, further comprising an interface for enabling the user to interface with said database and manage the parameter.

18. The system of claim 16, wherein said database is arranged to store start and stop dates determined by the user for the temporary suspension of delivery of communications.

19. The system of claim 16, wherein the database further comprises an additional user-determined delivery parameter indicative of whether the user wants to temporarily suspend delivery of all communications to their mobile device, said database being arranged to store start and stop dates determined by the user for suspension of delivery of all communications.

20. The system of claim 16, wherein the database further comprises an additional user-determined delivery parameter indicative of a selectable list of different communication sources from which the user could receive communications and a selectable list of different communication types which the user could receive.

21. The system of claim 16, wherein said communications management system includes a secondary communications management system arranged to manage communications to the user, said secondary communications management system being arranged to receive content intended for delivery to the user, data from said database about said user-determined delivery parameter and data about the communications network being used by the user to determine whether the content should be delivered to the user on the basis thereof, and if so, to control a communications network element to deliver the content to the user.

22. The system of claim 21, wherein said secondary communications management system is arranged to receive an indication, of the sender and recipient of communications and optionally the communications via the communications network element.

23. A system for managing delivery of communications to a user of a mobile communications device, comprising:
 a communications management system arranged to receive content from content providers for delivery to the user;
 a database containing a user-determined parameter relating to delivery of communications to their mobile communications device, said parameter being a parameter relating to temporary suspension of delivery of communications; and
 a communications network coupled to said communications management system and said database for delivering communications containing said content from said communications management system to the user in accordance with the user-determined parameter in said database, wherein the database is in operative association with a processing component arranged to control changes to the parameter in accordance with temporal criteria so as to control the time during which delivery of communications is suspended, said processing component being further arranged to extend a predetermined period of time, during which the user is required to receive, be available to receive or respond to communications, by the duration of time for which the user has temporarily suspended delivery of communications,
 said communications management system including a secondary communications management system arranged to manage communications to the user, said secondary communications management system being arranged to receive content intended for delivery to the user, data from said database about said user-determined delivery parameter and data about the communications network being used by the user to determine whether the content should be delivered to the user on the basis thereof, and if so, to control a communications network element to deliver the content to the user.

24. The system of claim 23, wherein said secondary communications management system is arranged to receive an indication of the sender and recipient of communications and optionally the communications via the communications network element.

25. The system of claim 23, wherein said parameter relates to suspension of delivery of communications when the user is using a roaming communications network which is not the user's home communications network.

26. The system of claim 23, further comprising an interface for enabling the user to interface with said database and manage the parameter.

27. The system of claim 23, wherein said database is arranged to store start and stop dates determined by the user for the temporary suspension of delivery of communications.

28. The system of claim 23, wherein the database further comprises an additional user-determined delivery parameter indicative of whether the user wants to temporarily suspend delivery of all communications to their mobile device, said database being arranged to store start and stop dates determined by the user for suspension of delivery of all communications.

29. The system of claim 23, wherein the database further comprises an additional user-determined delivery parameter indicative of a selectable list of different communication sources from which the user could receive communications and a selectable list of different communication types which the user could receive.

* * * * *

UNITED STATES PATENT AND TRADEMARK OFFICE
CERTIFICATE OF CORRECTION

PATENT NO. : 7,764,968 B2
APPLICATION NO. : 12/082175
DATED : July 27, 2010
INVENTOR(S) : Timo Ahopelto et al.

Page 1 of 1

It is certified that error appears in the above-identified patent and that said Letters Patent is hereby corrected as shown below:

On the title page, under the heading of (56) References Cited, below "OTHER PUBLICATIONS,"

please insert the following non-patent literatures:

--Notification Concerning Transmittal of Copy of International Preliminary Report on Patentability (Chapter 1 of the Patent Cooperation Treaty) mailed January 7, 2010 in related International Application PCT/EP2008/057726.

International Preliminary Report on Patentability mailed January 7, 2010 in related International Application PCT/EP2008/057726.

Written Opinion of the International Searching Authority mailed January 7, 2010 in related International Application PCT/EP2008/057726.--

Signed and Sealed this

Twelfth Day of October, 2010

David J. Kappos
*Director of the United States Patent and Trademark Office*